US010531337B2

(12) United States Patent
Yoshimura et al.

(10) Patent No.: US 10,531,337 B2
(45) Date of Patent: Jan. 7, 2020

(54) COMMUNICATION CONTROL SYSTEM, COMMUNICATION CONTROL METHOD, PROGRAM, AND RELAY APPARATUS

(71) Applicant: SoftBank Corp., Tokyo (JP)

(72) Inventors: Takayuki Yoshimura, Tokyo (JP); Masahiko Nanri, Tokyo (JP); Masanori Nomachi, Tokyo (JP); Takanori Takii, Tokyo (JP); Jumpei Takagi, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 223 days.

(21) Appl. No.: 15/511,148

(22) PCT Filed: Jan. 25, 2017

(86) PCT No.: PCT/JP2017/002545
§ 371 (c)(1),
(2) Date: Mar. 14, 2017

(87) PCT Pub. No.: WO2018/135009
PCT Pub. Date: Jul. 26, 2018

(65) Prior Publication Data
US 2019/0090157 A1 Mar. 21, 2019

(30) Foreign Application Priority Data
Jan. 19, 2017 (JP) ................. 2017-007463

(51) Int. Cl.
H04W 28/08 (2009.01)
H04W 28/18 (2009.01)
(Continued)

(52) U.S. Cl.
CPC ......... H04W 28/085 (2013.01); H04W 16/26 (2013.01); H04W 28/0257 (2013.01);
(Continued)

(58) Field of Classification Search
None
See application file for complete search history.

(56) References Cited

U.S. PATENT DOCUMENTS 7,123,911 B1* 10/2006 Ngan ................. H04B 7/15535
455/435.2
2001/0050909 A1 12/2001 Taketsugu
(Continued)

FOREIGN PATENT DOCUMENTS

JP H10-327451 A 12/1998
JP 2001-358763 A 12/2001
(Continued)

OTHER PUBLICATIONS

WIPO, International Search Report for International Patent Application No. PCT/JP2017/002545, dated Apr. 18, 2017.

Primary Examiner — Anh Vu H Ly

(57) ABSTRACT

Communication quality of a terminal device which directly connects to a macro cell base station is guaranteed and communication quality of a terminal device which connects to the macro cell base station via a relay apparatus is guaranteed. A communication control system includes: an acquisition unit that acquires communication status information including a past communication traffic volume between the macro cell base station and a relay apparatus 20; a setting unit that presets a first permitted communication traffic volume for a first communication period during which a communication traffic volume between the macro cell base station and the relay apparatus 20 is equal to or more than a specified communication traffic volume, and a second permitted communication traffic volume for a second communication period during which the communication traffic volume is less than the specified communication traffic volume, on the basis of the communication status information; a measurement unit that measures a current commu-
(Continued)

nication traffic volume between the macro cell base station and the relay apparatus 20; and a control unit that controls the second permitted communication traffic volume on the basis of the measured current communication traffic volume.

12 Claims, 8 Drawing Sheets

(51) Int. Cl.
*H04W 28/02* (2009.01)
*H04W 72/08* (2009.01)
*H04W 48/06* (2009.01)
*H04W 16/26* (2009.01)
*H04W 28/04* (2009.01)
*H04W 84/04* (2009.01)
*H04W 28/16* (2009.01)

(52) U.S. Cl.
CPC ........... *H04W 28/08* (2013.01); *H04W 28/18* (2013.01); *H04W 48/06* (2013.01); *H04W 72/085* (2013.01); *H04W 28/0289* (2013.01); *H04W 28/04* (2013.01); *H04W 28/16* (2013.01); *H04W 84/045* (2013.01); *H04W 84/047* (2013.01)

(56) References Cited

U.S. PATENT DOCUMENTS

| | | | | |
|---|---|---|---|---|
| 2002/0150117 | A1* | 10/2002 | Baba | H04L 41/0896 370/442 |
| 2008/0171553 | A1* | 7/2008 | Ren | H04W 72/02 455/450 |
| 2008/0207214 | A1* | 8/2008 | Han | H04B 7/15542 455/450 |
| 2009/0325622 | A1* | 12/2009 | Matsumura | H04B 7/2606 455/522 |
| 2011/0016212 | A1* | 1/2011 | Matsumoto | H04L 12/40013 709/224 |
| 2012/0258764 | A1 | 10/2012 | Asaoka et al. | |
| 2014/0003325 | A1* | 1/2014 | Tanimoto | H04W 16/26 370/315 |
| 2014/0334374 | A1* | 11/2014 | Hyde | H04W 16/26 370/315 |
| 2016/0366632 | A1* | 12/2016 | Cui | H04W 40/04 370/328 |
| 2018/0035308 | A1* | 2/2018 | Nguyen | H04W 76/14 370/328 |
| 2018/0054756 | A1* | 2/2018 | Kahtava | H04W 28/0284 370/328 |
| 2018/0077650 | A1* | 3/2018 | Nakahara | H04W 52/0229 370/328 |

FOREIGN PATENT DOCUMENTS

| | | |
|---|---|---|
| JP | 2011-193418 A | 9/2011 |
| JP | 2013-524573 A | 6/2013 |
| JP | 5456874 B1 | 4/2014 |
| JP | 6025892 B2 | 11/2016 |
| WO | 2011/078329 A1 | 6/2011 |
| WO | 2011/119996 A1 | 9/2011 |

* cited by examiner

Fig. 4

| QCI | Bit Rate Guarantee | Priority | Delay Tolerance | Loss Rate | Application |
|---|---|---|---|---|---|
| 1 | GBR | 2 | 100ms | 1.00E-02 | VoIP |
| 2 | GBR | 4 | 150ms | 1.00E-03 | Video call |
| 3 | GBR | 5 | 300ms | 1.00E-06 | Streaming |
| 4 | GBR | 3 | 50ms | 1.00E-03 | Real-time Game |
| 5 | Non-GBR | 1 | 100ms | 1.00E-06 | IMS Signaling |
| 6 | Non-GBR | 7 | 100ms | 1.00E-03 | Interactive Game |
| 7 | Non-GBR | 6 | 300ms | 1.00E-06 | TCP Protocol |
| 8 | Non-GBR | 8 | 300ms | 1.00E-06 | (Browsing, E-mails, File Downloading) |
| 9 | Non-GBR | 9 | 300ms | 1.00E-06 | |

COMMUNICATION CONTROL SYSTEM, COMMUNICATION CONTROL METHOD, PROGRAM, AND RELAY APPARATUS

TECHNICAL FIELD

The present invention relates to a communication control system, a communication control method, a program, and a relay apparatus that control communication for a relay apparatus capable of relaying communication between a terminal device(s) and a macro cell base station.

BACKGROUND ART

The LTE (Long Term Evolution) has become widespread as a common specification for radio communication systems in place of third-generation mobile communications systems (3G: 3rd Generation). The LTE is a telecommunications specification that supports only packet communications, and voices are converted into packets according to VoIP (Voice over Internet Protocol) and the converted packets are then transmitted and received. Particularly, the VoIP of the LTE specification is called VoLTE (Voice over LTE).

Regarding a mobile communications system, a home base station is installed and made to relay communication between a terminal device and a core network in order to secure communication quality within a building. Conventionally, a fixed line has been used for communication from the home base station to the core network (for example, see PTL 1).

When the fixed line is used as a backhaul like in a technique described in PTL 1, there are problems such as time required to install the fixed line and running costs for the fixed line. Accordingly, the use of radio communication for the backhaul communication is proposed as described in PTL 2.

CITATION LIST

Patent Literature

PTL 1: Japanese Patent No. 5456874
PTL 2: Japanese Patent No. 6025892

SUMMARY OF THE INVENTION

Technical Problem

However, a macro cell base station is designed to perform radio communications directly with a terminal device. So, if the radio communication is used also for the backhaul communication of the home base station, there is a possibility that resources allocated to the terminal device which directly connects to the macro cell base station may decrease and the communication quality may degrade. On the other hand, if a communication traffic volume of the terminal device which directly connects to the macro cell base station increases, this may cause a problem in that resources to be allocated to the backhaul communication of the home base station may become insufficient and the communication quality of the terminal device connected via the home base station may degrade.

Accordingly, the present invention was devised in light of the above-described circumstances; and when communication of a relay apparatus capable of relaying communication between a terminal device(s) and a macro cell base station is to be controlled, it is one of objects to guarantee communication quality of a terminal device which directly connects to the macro cell base station and communication quality of a terminal device which connects to the macro cell base station via the relay apparatus.

Solution to Problem

A communication control system according to an aspect of the present invention is a communication control system for controlling communication of a relay apparatus capable of relaying communication between a terminal device(s) and a macro cell base station, wherein the communication control system includes: an acquisition unit that acquires communication status information including a past communication traffic volume between the macro cell base station and the relay apparatus; a setting unit that presets a first permitted communication traffic volume for a first communication period during which a communication traffic volume between the macro cell base station and the relay apparatus is equal to or more than a specified communication traffic volume, and a second permitted communication traffic volume for a second communication period during which the communication traffic volume is less than the specified communication traffic volume, on the basis of the communication status information; a measurement unit that measures a current communication traffic volume between the macro cell base station and the relay apparatus; and a control unit that controls the set second permitted communication traffic volume on the basis of the measured current communication traffic volume.

Regarding the communication control system, the control unit may increase or decrease the set second permitted communication traffic volume according to a difference between the set second permitted communication traffic volume and the current communication traffic volume upon communication between the macro cell base station and the relay apparatus.

Regarding the communication control system, when the relay apparatus is to accept a new call from the terminal device and the control unit can determine that the current communication traffic volume upon the communication between the macro cell base station and the relay apparatus exceeds the set second permitted communication traffic volume, the control unit may prohibit the acceptance of the new call.

Regarding the communication control system, the control unit may prohibit the second permitted communication traffic volume from being decreased to a preset lower limit communication traffic volume or less.

Regarding the communication control system, the control unit may control the set second permitted communication traffic volume on the basis of quantity information indicative of a quantity of the terminal devices which communicate with the relay apparatus.

Regarding the communication control system, the control unit may control the second permitted communication traffic volume on the basis of communication quality including at least one of a delay in the communication between the macro cell base station and the relay apparatus, fluctuations of the communication, and a bit error rate of the communication.

Regarding the communication control system, the control unit may control a quantity of the terminals whose connection with the relay apparatus is permitted, as the second permitted communication traffic volume.

Regarding the communication control system, the setting unit may set the first permitted communication traffic volume on the basis of a maximum quantity of the terminal devices which can be connected.

Regarding the communication control system, the relay apparatus may include the acquisition unit, the setting unit, and the measurement unit; and a core network may include the control unit.

A communication control method according to an aspect of the present invention is a communication control method for controlling communication of a relay apparatus capable of relaying communication between a terminal device(s) and a macro cell base station, wherein the communication control method includes the steps of: acquiring communication status information including a past communication traffic volume between the macro cell base station and the relay apparatus; presetting a first permitted communication traffic volume for a first communication period during which a communication traffic volume between the macro cell base station and the relay apparatus is equal to or more than a specified communication traffic volume, and a second permitted communication traffic volume for a second communication period during which the communication traffic volume is less than the specified communication traffic volume, on the basis of the communication status information; measuring a current communication traffic volume between the macro cell base station and the relay apparatus; and controlling the set second permitted communication traffic volume on the basis of the measured current communication traffic volume.

A program according to an aspect of the present invention is a program for causing a computer to function as: an acquisition unit that acquires communication status information including a past communication traffic volume between a macro cell base station and a relay apparatus; a setting unit that presets a first permitted communication traffic volume for a first communication period during which a communication traffic volume between the macro cell base station and the relay apparatus is equal to or more than a specified communication traffic volume, and a second permitted communication traffic volume for a second communication period during which the communication traffic volume is less than the specified communication traffic volume, on the basis of the communication status information; a measurement unit that measures a current communication traffic volume between the macro cell base station and the relay apparatus; and a control signal generation unit that controls the set second permitted communication traffic volume on the basis of the measured current communication traffic volume.

A relay apparatus according to an aspect of the present invention is a relay apparatus capable of relaying communication between a terminal device(s) and a macro cell base station, wherein the relay apparatus includes: an acquisition unit that acquires communication status information including a past communication traffic volume between the macro cell base station and the relay apparatus; a setting unit that presets a first permitted communication traffic volume for a first communication period during which a communication traffic volume between the macro cell base station and the relay apparatus is equal to or more than a specified communication traffic volume, and a second permitted communication traffic volume for a second communication period during which the communication traffic volume is less than the specified communication traffic volume, on the basis of the communication status information; a measurement unit that measures a current communication traffic volume between the macro cell base station and the relay apparatus; and a control signal generation unit that generates a control signal for controlling the set second permitted communication traffic volume on the basis of the measured current communication traffic volume.

Advantageous Effects of the Invention

According to the present invention, necessary bandwidths for the communication between the macro cell base station and the relay apparatus can be managed appropriately and bandwidths used for the communication between the macro cell base station and the relay apparatus, and terminal devices can be allocated appropriately, so that the communication quality of a terminal device which directly connects to the macro cell base station can be guaranteed and the communication quality of a terminal device which connects to the macro cell base station via the relay apparatus can be guaranteed.

BRIEF DESCRIPTION OF DRAWINGS

FIG. 4 is an explanatory diagram of QCI parameters according to an embodiment;

DESCRIPTION OF EMBODIMENTS

Figure 1:
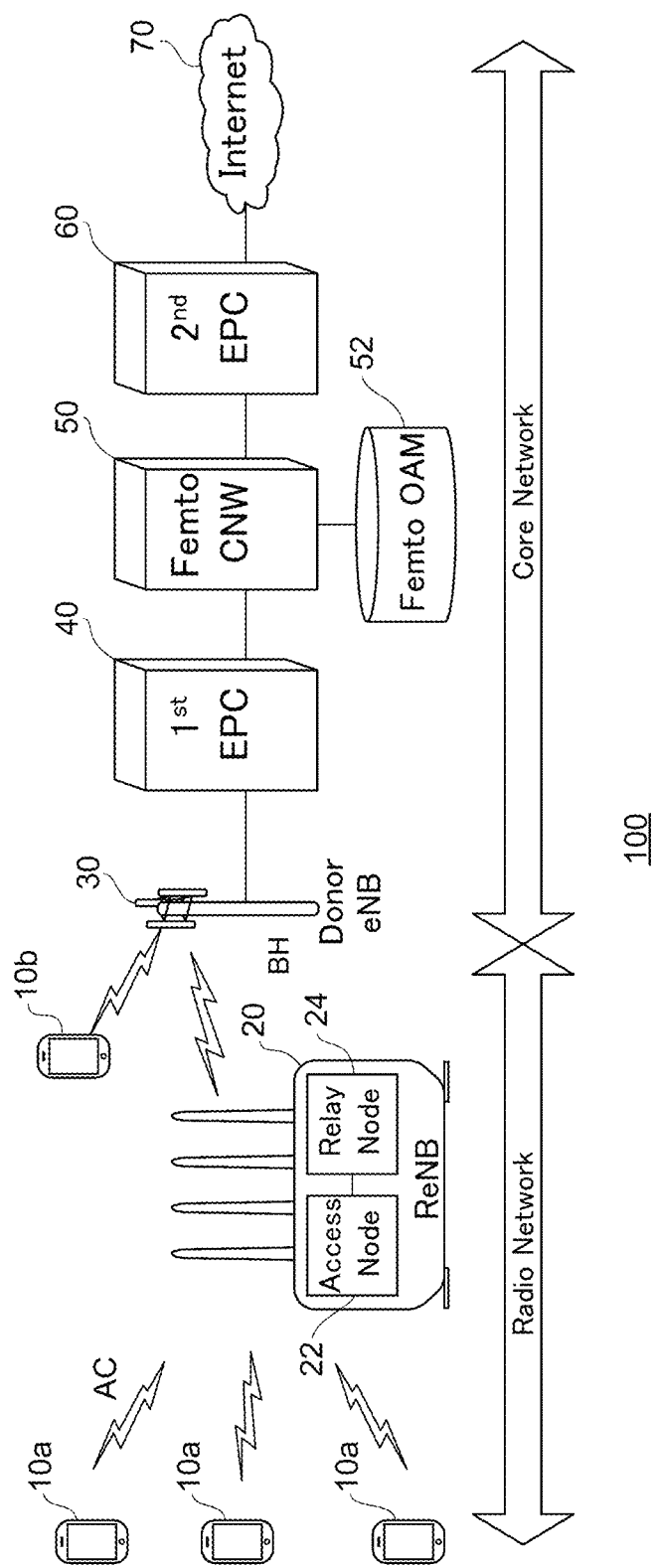
FIG. 1 is a schematic diagram of a mobile communications system according to an embodiment.

An embodiment of the present invention will be explained below with reference to the attached drawings. However, the embodiment explained below will be given merely for the purpose of illustration and there is no intention to exclude application of various variations or techniques which are not clearly specified below. In other words, the present invention can be implemented with various modifications without the scope departing from the gist of the invention. Furthermore, the same or similar reference numerals are assigned to, and represent, the same or similar elements in the illustrations in the series of drawings.

[Configuration of Mobile Communications System]

FIG. 1 is a configuration diagram of a mobile communications system according to an embodiment. A mobile communications system 100 according to this embodiment is illustratively a mobile communications system according to the LTE system whose specifications are set in conformity with 3GPP and includes a radio network and a core network. The configuration of the radio network and the configuration of the core network will be explained sequentially below.

(Configuration of Radio Network)

Referring to FIG. 1, the mobile communications system 100 includes terminal devices 10, a relay apparatus 20, and a donor base station (macro cell base station) 30 as the configuration of the radio network. Incidentally, the radio network is called E-UTRAN (Evolved Universal Terrestrial Radio Access Network) according to the LTE system.

The terminal device 10 is a mobile portable communication terminal such as a smartphone or a cell phone and is also called UE (User Equipment). FIG. 1 illustrates: terminal devices 10a that exist in a service area of a cell (the range capable of communication) formed by the relay apparatus 20 and are connected to the relay apparatus 20; and a terminal device 10b that exists in a service area of a cell formed by the donor base station 30 and is connected to the donor base station 30. The terminal devices 10a and the terminal device 10b will be hereinafter sometimes collectively referred to as the terminal device 10.

The relay apparatus 20 can be moved and is also called a ReNB (Repeater type eNodeB) according to the LTE system and constitutes one node in the radio network.

The relay apparatus 20 is configured by including an access node 22 and a relay node 24.

The access node 22 establishes radio communication with the terminal devices 10a and provides the terminal devices 10a with packet communication services (such as voice packet communication services and multimedia services). Radio communication between the access node 22 and the terminal devices 10a is also called an access link (AC: Access Link). Regarding the cell formed by the access node 22, its cell size is of a smaller scale than that of the donor base station 30 and the cell constructs a communication area with a radius ranging from several meters to tens of meters.

The access node 22 establishes radio communication with the donor base station 30 via the relay node 24. The relay node 24 is also called CPE (Customer Premises Equipment). Radio communication between the relay node 24 and the donor base station 30 is also called backhaul (BH: Backhaul).

Incidentally, the access node 22 and the relay node 24 may be configured as separate nodes. When they are configured as the separate nodes, the relay node 24 serves the role of the relay apparatus according to the present invention.

The donor base station 30 is also called a Donor eNB (Donor eNode B) according to the LTE system and establishes radio communication via the relay node 24. The donor base station 30 constructs a communication area with a radius ranging from hundreds of meters to tens of kilometers.

(Configuration of Core Network)

Referring to FIG. 1, the mobile communications system 100 includes a first core network EPC (Evolved Packet Core) 40, a femto core network 50 (communication control server), and a second core network EPC 60 as the configuration of the core network. Incidentally, this embodiment is explained as including the first core network EPC 40 and the second core network EPC 60; however, the core network may be configured from one core network EPC.

The first core network EPC 40 is connected to, for example, the donor base station 30 and has: a function that manages movements of, and certifies, individual terminal devices 10b and the relay node 24 via the donor base station 30, and manages processing for setting packet communication data paths; a function that performs quality control of the radio network; a function that controls call connections to provide mobile communications services and controls the services; and a function that serves as a switching station to receive calls from external networks such as the Internet 70 to contract subscribers in the radio network or subscribers who are roaming in the radio network.

The femto core network 50 is a network for performing various kinds of management regarding the relay apparatus 20. The femto core network 50 is connected to, for example, a femto OAM (Femto Operations Administration Maintenance) 52 and has a function that operates, manages, and maintains the relay apparatus 20.

The second core network EPC 60 has, for example: a function that controls call connections to provide mobile communication services or controls the services; a function that serves as a switching station to receive calls from external networks such as the Internet 70 to contract subscribers in the radio network or subscribers who are roaming in the radio network; a function that manages movements of, and certifies, the individual terminal devices 10a in the second core network EPC 60 and manages processing for setting packet communication data paths; and a function that performs communication policy control such as quality control and performs control pursuant to billing rules.

Figure 2:
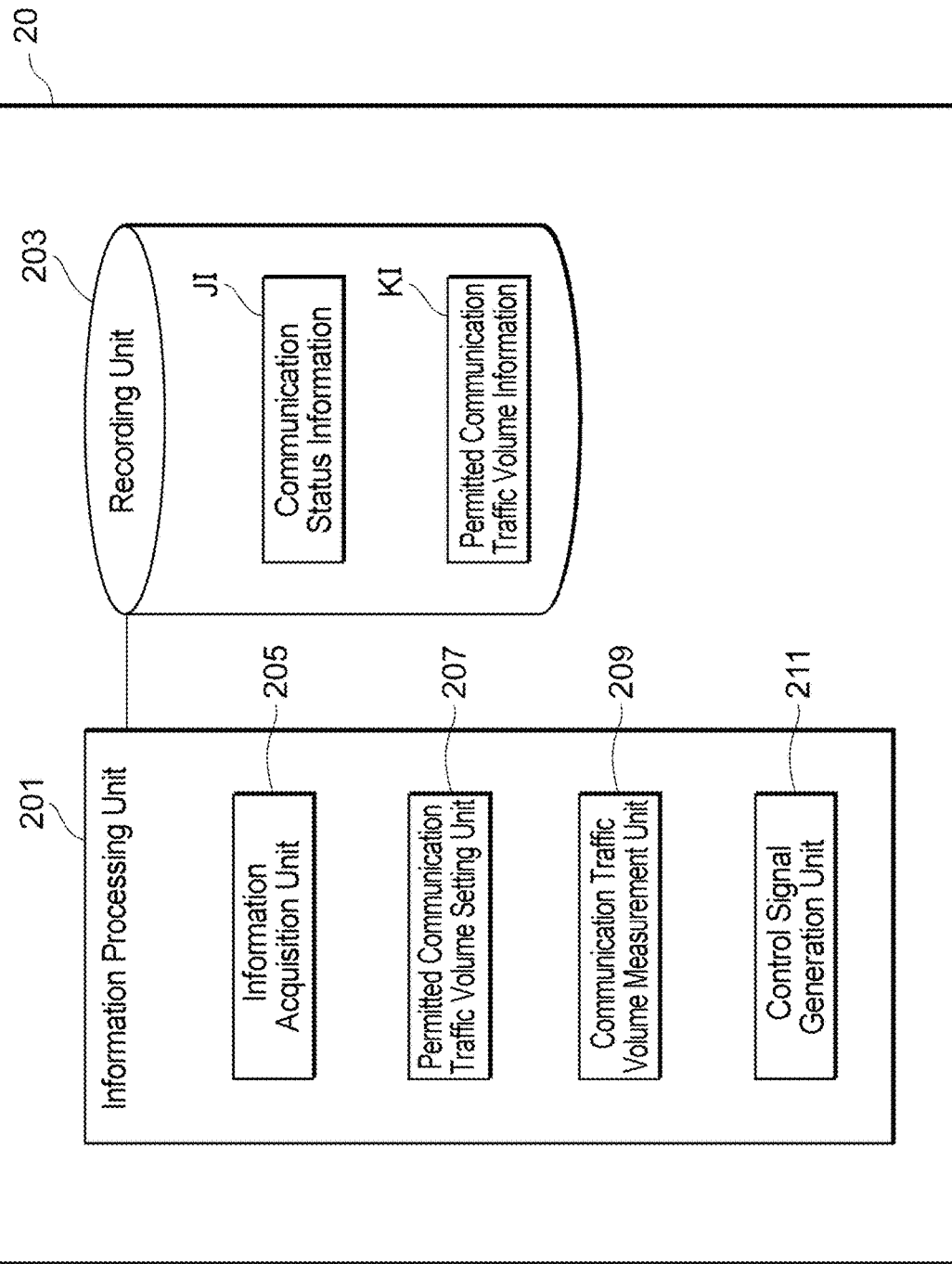
FIG. 2 is a configuration diagram of a relay apparatus according to an embodiment.

FIG. 2 is a configuration diagram of a relay apparatus according to an embodiment of the present invention. Referring to FIG. 2, the relay apparatus 20 illustratively includes: an information processing unit 201 that executes information processing for controlling communication between the donor base station 30 and the relay apparatus 20; and an information recording unit 203 that records information used when controlling the communication between the donor base station 30 and the relay apparatus 20, for example, communication status information JI acquired by an information acquisition unit 205 described later and permitted communication traffic volume information KI including at least one of a first permitted communication traffic volume and a second permitted communication traffic volume which are set by a permitted communication traffic volume setting unit 207. Incidentally, the permitted communication traffic volume information KI may include information indicative of a preset lower limit communication traffic volume described later.

The information processing unit 201 functionally includes: the information acquisition unit 205 (acquisition unit) that acquires communication status information including a past communication traffic volume between the donor base station 30 and the relay apparatus 20; a permitted communication traffic volume setting unit 207 (setting unit) that presets a first permitted communication traffic volume for a first communication period, during which a communication traffic volume between the donor base station 30 and the relay apparatus 20 is equal to or more than a specified communication traffic volume, and a second permitted communication traffic volume for a second communication period, during which the communication traffic volume is less than the specified communication traffic volume, on the basis of the communication status information; a communication traffic volume measurement unit 209 (measurement unit) that measures a current communication traffic volume between the donor base station 30 and the relay apparatus 20; and a control signal generation unit 211 that generates a control signal for controlling the second permitted communication traffic volume which is set by the permitted communication traffic volume setting unit 207 on the basis of the current communication traffic volume measured by the communication traffic volume measurement unit 209.

Figure 3:
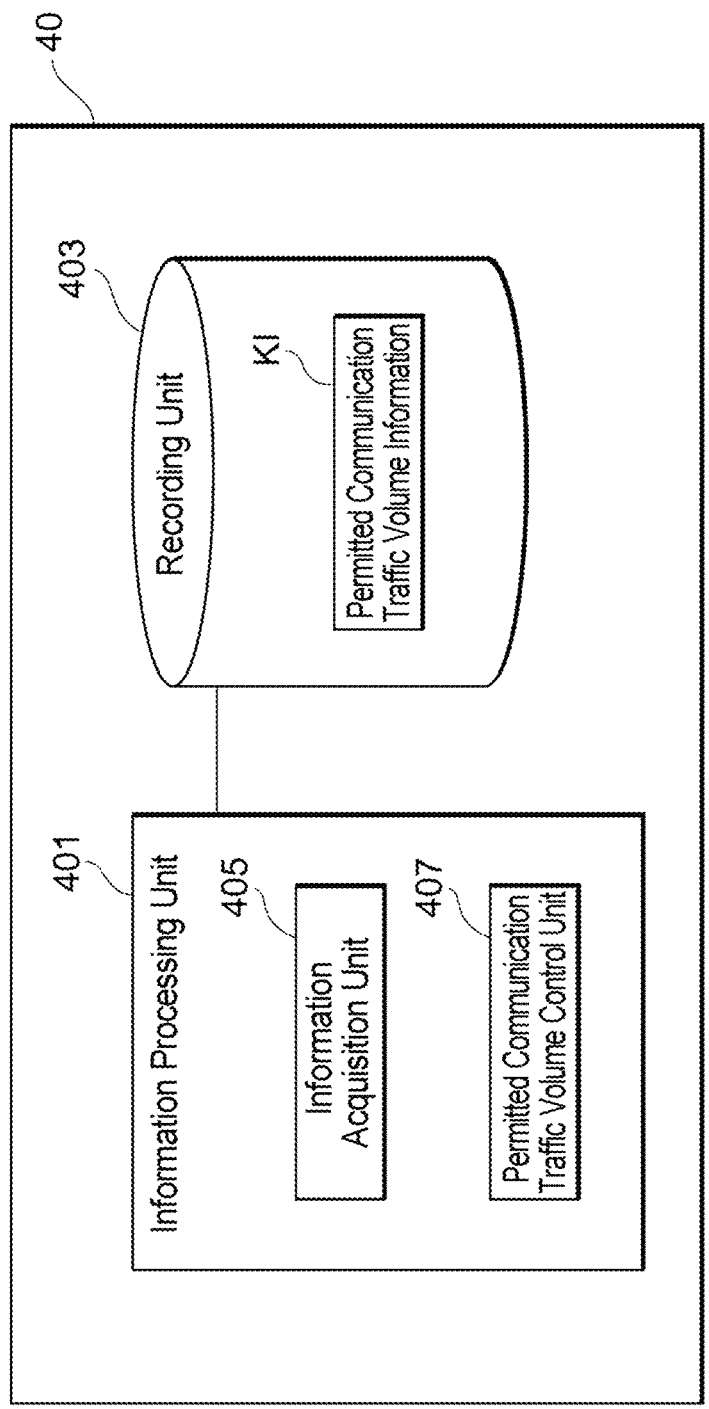
FIG. 3 is a configuration diagram of a first core network EPC (Evolved Packet Core) according to an embodiment.

FIG. 3 is a configuration diagram of the first core network EPC according to an embodiment of the present invention. Referring to FIG. 3, the first core network EPC 40 illustratively includes: an information processing unit 401 that executes information processing for controlling communication between the donor base station 30 and the relay apparatus 20 as illustrated in FIG. 1; and an information recording unit 403 that records the permitted communication traffic volume information KI acquired by the information acquisition unit 405 from the relay apparatus 20.

The information processing unit 401 functionally includes: an information acquisition unit 405 that acquires the control signal for controlling the set second permitted communication traffic volume, and the permitted communication traffic volume information KI from the relay apparatus 20; and a permitted communication traffic volume control unit 407 that controls the set second permitted communication traffic volume on the basis of the control signal. Incidentally, the permitted communication traffic volume information KI from the relay apparatus 20 may be included in the control signal.

Under this circumstance, a QCI (QoS Class Identifier) is set according to the LTE specification as a parameter for controlling the quality of sessions on a radio network side and a core network side as illustrated in FIG. 1. A session is also called a DB (Default Bearer) and is a virtual conceptual unit indicative of a method of handling data from a terminal device upon communication between networks. Each QCI parameter defines one session and specifies, for example, nine-level priorities according to whether bandwidths (a communication traffic volume per unit time) are controlled or not, delay tolerance time, packet loss rate, and so on.

FIG. 4 is a diagram illustrating a list of QCI parameters. Referring to FIG. 4, QCI1 to 4 are GBRs (Guaranteed Bit Rates) which guarantee bandwidths; and QCI5 to 9 are Non-GBRs which do not guarantee the bandwidths. The first core network EPC 40 illustrated in FIG. 1 is designed to be capable of setting the QCI parameters according to the communication quality in the radio network. Specifically speaking, the first core network EPC 40 is designed to generate sessions corresponding to the QCI parameters with respect to communication with the relay apparatus 20. A session is called a DB (Default Bearer or Dedicated Bearer) and each DB can secure a certain communication traffic volume in accordance with the bandwidths (such as the communication traffic volume per unit time), delay tolerance, and bit loss which are defined by the QCIs.

[Communication Control Processing]

The outline of communication control processing for controlling communication between the donor base station and the relay apparatus will be described below. The relay apparatus 20 illustrated in FIG. 1: presets a first permitted communication traffic volume for a busy period during which the communication traffic volume between the donor base station 30 and the relay apparatus 20 is heaviest (first communication period), and a second permitted communication traffic volume for a period of time during which the communication traffic volume is less than that of the busy period (a second communication period), on the basis of the acquired communication status information; generates a control signal for controlling the preset second permitted communication traffic volume on the basis of a current communication traffic volume between the donor base station 30 and the relay apparatus 20; and transmits the control signal to the first core network EPC 40. The first core network EPC 40 dynamically controls the preset second permitted communication traffic volume on the basis of the received control signal. The details of the communication control processing according to a first embodiment will be explained below.

First Embodiment

Figure 5:
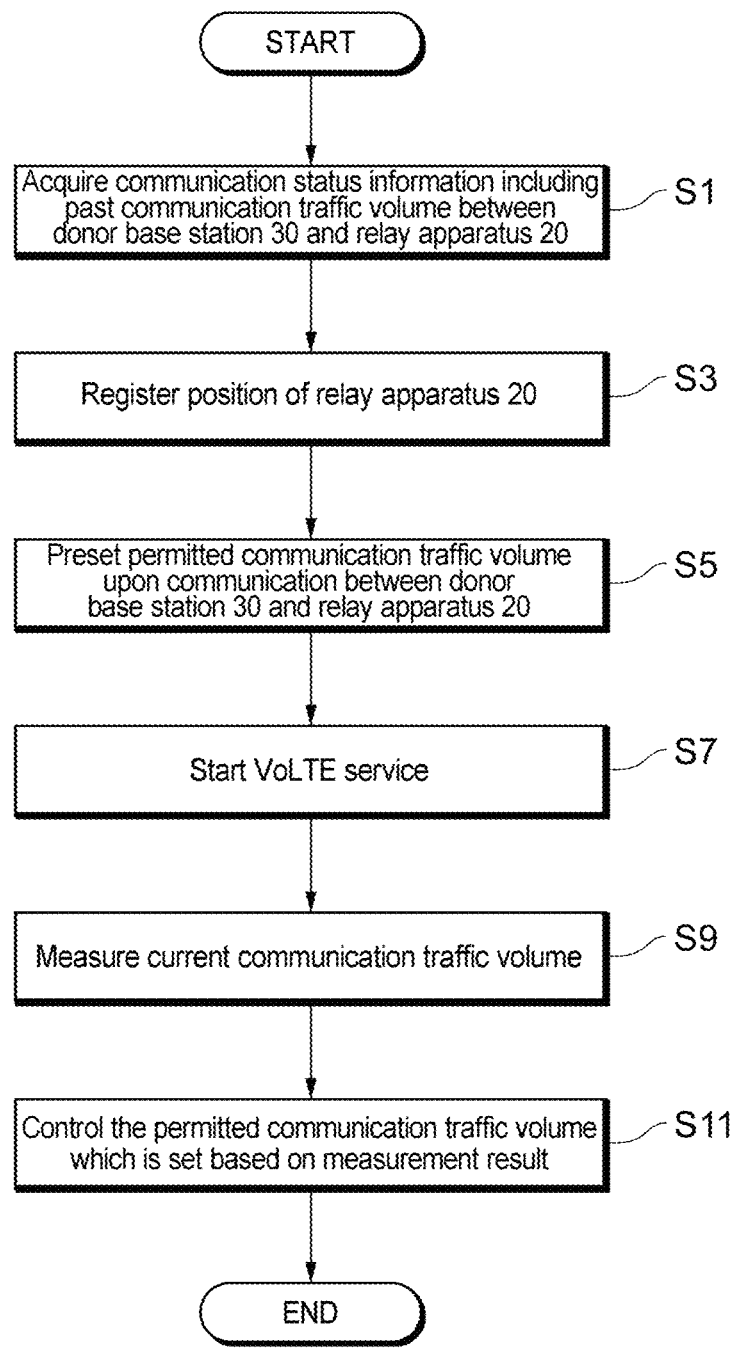
FIG. 5 is a sequence diagram for explaining a procedure sequence for communication control processing according to an embodiment.
Figure 6:
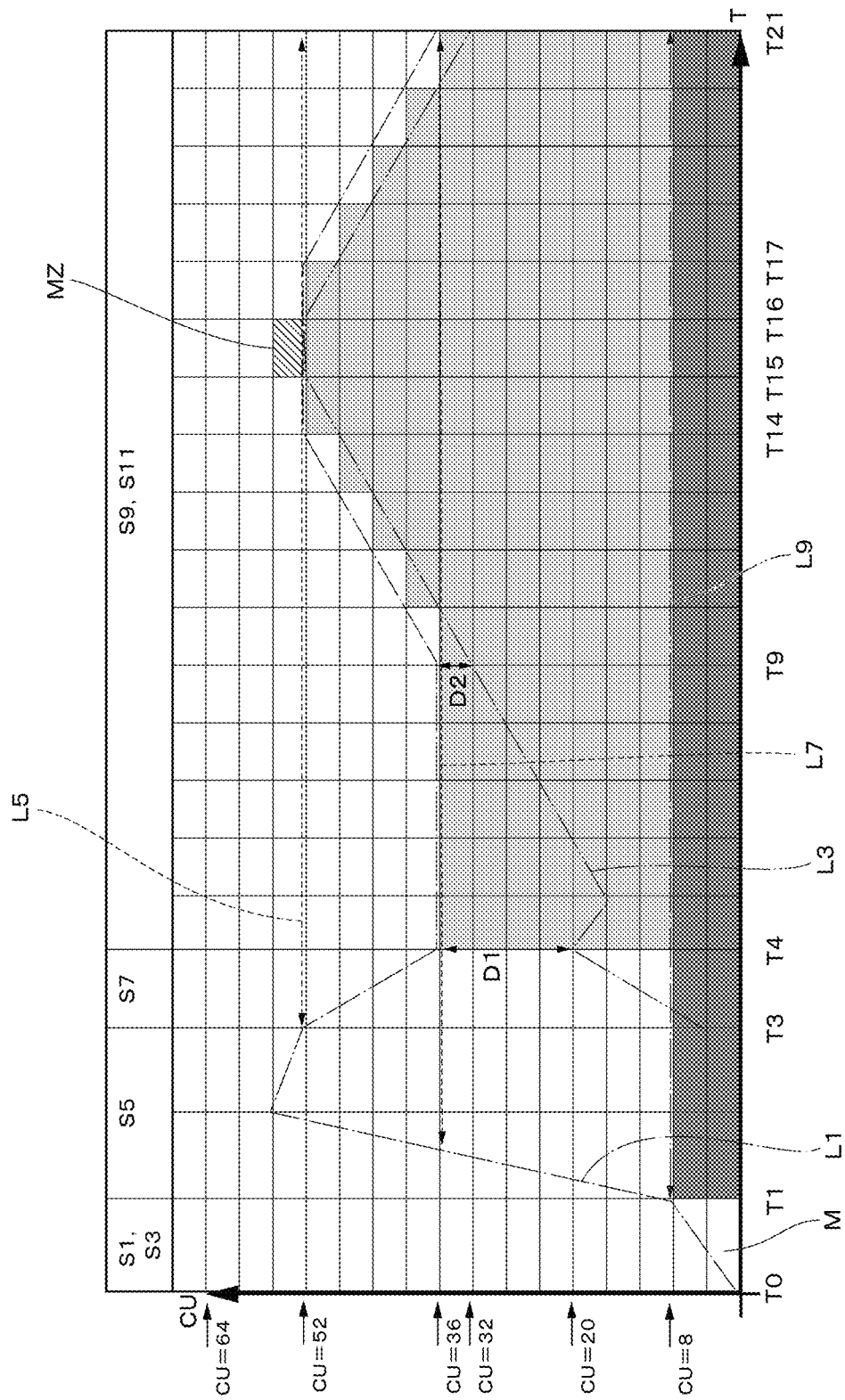
FIG. 6 is a schematic diagram for explaining communication control processing according to a first embodiment.

The first embodiment of the communication control processing for controlling communication between the donor base station and the relay apparatus will be explained by using FIG. 5 and FIG. 6. FIG. 5 is a sequence diagram for explaining a procedure sequence for the communication control processing for controlling the communication between the donor base station and the relay apparatus. FIG. 6 is a diagram illustrating the communication control processing when the relay apparatus cannot acquire quantity information indicative of the quantity of terminal devices existing in its service area.

The correspondence relationship between FIG. 5 and FIG. 6 will be explained as follows: steps S1 and S3 in FIG. 5 correspond to period (T0 to T1) in FIG. 6; step S5 in FIG. 5 corresponds to period (T1 to T3) in FIG. 6; step S7 in FIG. 5 corresponds to period (T3 to T4) in FIG. 6; and steps S9 and S11 in FIG. 5 correspond to period (T4 to T21) in FIG. 6. Under this circumstance, "CU (Channel Utilization)" in FIG. 6 represents an occupied bandwidth and "T" represents time. In this embodiment, a maximum value for the occupied bandwidth is CU=64. One cell M represents the occupied bandwidth of CU=4. Furthermore, broken line L1 represents a transition of the permitted communication traffic volume in each of the steps mentioned above and broken line L3 represents a transition of the bandwidth actually used for the communication (such as the communication traffic volume per unit time). Incidentally, the occupied bandwidth of CU=8 is used as a vacant bandwidth to be used, for example, for the Two-Way Active Measurement Protocol (TWAMP: Two Way Active Measurement Protocol) for a communication quality test, or for emergency calls.

(Step S1 in FIG. 5 and T0 to T1 in FIG. 6)

The information acquisition unit 205 illustrated in FIG. 2 acquires communication status information including a past communication traffic volume between the donor base station 30 and the relay apparatus 20. For example, the information acquisition unit 205 acquires, as the communication status information, the communication traffic volume between the donor base station 30 and the relay apparatus 20 at each communication timing executed between the donor base station 30 and the relay apparatus 20 in the past.

More specifically, with the mobile communications system 100 illustrated in FIG. 1, an IPsec is firstly established which is a protocol to assign a concealing function on a packet data basis upon packet communication between the relay apparatus 20 and the first core network EPC 40. For example, once a session (DB) according to parameter QCI5 indicated in FIG. 4 is generated and the IPsec is established, control data can be transmitted and received between the relay apparatus 20 and the first core network EPC 40.

Next, after the IPsec is established, a data communication DB is further established. The first core network EPC 40 generates a DB according to parameter QCI9 indicated in FIG. 4 on the basis of a request from the relay apparatus 20 to generate the data communication DB. As a result of the above-described processing, packet data routed through the relay apparatus 20 can be transmitted to the second core network EPC60 via this DB.

Furthermore, after the data communication DB is established, a voice communication DB is further established. For example, the first core network EPC 40 generates a voice communication DB according to parameter QCI1 in response to a DB generation request from the relay apparatus 20. A VoLTE DB is established between the relay apparatus 20 and the first core network EPC 40. As a result of the above-described processing, the voice communication from the terminal device 10a via the core network becomes possible.

Accordingly, when the voice communication from the terminal device 10a via the core network has been performed in the past, the information acquisition unit 205 acquires the communication traffic volume between the donor base station 30 and the relay apparatus 20 as the communication status information. Incidentally, the information acquisition unit 205 may be configured to acquire the communication status information every time the voice communication from the terminal device 10a via the core network has been performed in the past, or acquire the communication status information collectively after a specified number of voice communications are performed. Furthermore, the communication status information may include, besides the past communication traffic volume, information regarding the communication quality such as a delay amount, delay fluctuations (jitter), bit error amount, and bit error rate of the communication between the donor base station 30 and the relay apparatus 20 in the past.

(Step S3 in FIG. 5 and T0 to T1 in FIG. 6)

Upon starting this voice communication, the first core network EPC 40 illustrated in FIG. 1 registers the position of the relay apparatus 20. For example, the first core network EPC 40 checks whether or not the relay apparatus 20 exists in a service area within a communication-enabled range of the donor base station 30 which connects to the first core network EPC 40; and if the relay apparatus 20 exists in the service area, the first core network EPC 40 registers the position of the relay apparatus 20.

(Step S5 in FIG. 5 and T1 to T3 in FIG. 6)

The permitted communication traffic volume setting unit 207 illustrated in FIG. 2 presets, on the basis of the communication status information acquired in step S1 in FIG. 5: a permitted communication traffic volume CU=52 (first permitted communication traffic volume) (see broken line L5) corresponding to an effective throughput value during a busy period when the communication traffic volume is heaviest upon communication between the donor base station 30 and the relay apparatus 20; and a permitted communication traffic volume CU=36 (second permitted communication traffic volume) (see broken line L7) for a period during which the communication traffic volume is less than that of the busy period (for example, periods other than T14 to T17 in FIG. 6). Under this circumstance, the permitted communication traffic volume setting unit 207 may be configured to set the first permitted communication traffic volume on the basis of a maximum quantity of terminal devices 10a which can be connected to the relay apparatus 20. Incidentally, the permitted communication traffic volume setting unit 207 does not necessarily have to set the permitted communication traffic volume CU=52 for the busy period or the permitted communication traffic volume CU=36 for the period during which the communication traffic volume is less than that of the busy period, with respect to the period corresponding to T1 to T3; and it is only necessary to set them before the period (T3 to T4) when a VoLTE communication described later is started. Furthermore, it is useful to measure the effective throughput value for the busy period when the communication traffic volume is heaviest upon the communication between the donor base station 30 and the relay apparatus 20 because the permitted communication traffic volume can be controlled appropriately, for example, according to the position of the relay apparatus 20 located within the cell of the donor base station 30. Specifically speaking, when the relay apparatus 20 is located at, for example, an edge of the cell (Cell edge) of the donor base station 30, the effective throughput of the communication is low; and when the relay apparatus 20 is located around the center of the cell of the donor base station 30, the effective throughput of the communication is high. Accordingly, the communication between the donor base station 30 and the relay apparatus 20 can be controlled appropriately by measuring the effective throughput value according to the position of the relay apparatus 20 located within the cell of the donor base station 30 and using the measured value for this communication control processing.

(Step S7 in FIG. 5 and T3 to T4 in FIG. 6)

When the necessary processing for the voice communication according to the VoLTE is completed as described in detail in step S1 above, the voice communication from the terminal device 10a via the core network can be started. Incidentally, the establishment of the IPsec and the establishment of the data communication DB are completed at this point in time.

(Step S9 in FIG. 5)

When the voice communication according to the VoLTE actually starts, the communication traffic volume measurement unit 209 (measurement unit) illustrated in FIG. 2 measures a current communication traffic volume between the donor base station 30 and the relay apparatus 20 (see the broken line L3).

(Step S11 in FIG. 5)

The control signal generation unit 211 illustrated in FIG. 2 generates a control signal for controlling the second permitted communication traffic volume (see the broken line L1) set by the permitted communication traffic volume setting unit 207 on the basis of the current communication traffic volume (see the broken line L3) measured by the communication traffic volume measurement unit 209. Then, the relay apparatus 20 transmits the control signal to the first core network EPC 40 illustrated in FIG. 1 and the permitted communication traffic volume control unit 407 for the first core network EPC 40 illustrated in FIG. 3 controls the set second permitted communication traffic volume (see the broken line L1) on the basis of the control signal.

For example, the permitted communication traffic volume control unit 407 for the first core network EPC 40 increases or decreases the second permitted communication traffic volume CU=36 in accordance with the difference between the second permitted communication traffic volume CU=36 (see the broken line L1) set by the permitted communication traffic volume setting unit 207 and the current communication traffic volume (see the broken line L3) upon the communication between the donor base station 30 and the relay apparatus 20. Incidentally, the first permitted communication traffic volume (see the broken line L5) set by the permitted communication traffic volume setting unit 207, that is, the permitted communication traffic volume for the busy period during which the communication traffic volume upon the communication between the donor base station 30 and the relay apparatus 20 is heaviest is a set value as a limit quantity (threshold value) and thereby cannot be controlled.

More specifically, difference D1 between the permitted communication traffic volume CU=36 set by the permitted communication traffic volume setting unit 207 and the current communication traffic volume (CU=20) at time T4 indicated in FIG. 6 is CU=16. In this embodiment, control of the set second permitted communication traffic volume CU=36 is executed, for example, when the difference becomes CU=4 or less. Therefore, since the difference is more than CU=4 at time T4, the set second permitted communication traffic volume CU=36 is not controlled. Subsequently, at time T9, difference D2 between the second permitted communication traffic volume CU=36 set by the permitted communication traffic volume setting unit 207 and the current communication traffic volume (CU=32) is CU=4. Therefore, since the difference is CU=4 or less, the permitted communication traffic volume control unit 407 for the first core network EPC 40 increases the second permitted communication traffic volume CU=36 set by the permitted communication traffic volume setting unit 207.

Next, regarding period T9 to T14, the current communication traffic volume continues to increase, so that the second permitted communication traffic volume is controlled to also continue increasing. Then, regarding the period T14 to T17, the second permitted communication traffic volume reaches CU=52 which is the threshold value (see the broken line L5), so that the second permitted communication traffic volume will not increase any further. Under this circumstance, the permitted communication traffic volume control unit 407 for the first core network EPC 40 may be configured, as indicated at period T15 to T16 and cell MA, so that when the relay apparatus 20 is to accept a new call from the terminal device 10 and it can be judged that the communication traffic volume per unit time which is currently used upon the communication between the donor base station 30 and the relay apparatus 20 (see the broken line L3) exceeds the set second permitted communication traffic volume CU=52 (threshold value) (see the broken lines L3 and L5), the permitted communication traffic volume control unit 407 is prohibited from accepting the new call. Furthermore, the permitted communication traffic volume control unit 407 may be configured so that when the current communication traffic volume starts to decrease as indicated at period T17 to T21 and it is recognized that this decrease tendency continues, the permitted communication traffic volume control unit 407 decreases the second permitted communication traffic volume.

Furthermore, when the permitted communication traffic volume control unit 407 for the first core network EPC 40 decreases the second permitted communication traffic volume CU=36, the permitted communication traffic volume control unit 407 may be configured to be prohibited from decreasing the second permitted communication traffic volume to a preset lower limit communication traffic volume CU=8 (see broken line L9) or less. Since the lower limit communication traffic volume CU=8 is secured as a vacant bandwidth to be used, for example, for the Two-Way Active Measurement Protocol (TWAMP) for the communication quality test or for emergency calls as mentioned earlier, control of the permitted communication traffic volume to the extent making the execution of the TWAMP or the emergency calls impossible should be prohibited.

Second Embodiment

A second embodiment is different from the first embodiment because in the second embodiment the relay apparatus can acquire quantity information indicative of the quantity of terminal devices which communicate with the relay apparatus and exist in its service area, while in the first embodiment the relay apparatus 20 cannot acquire the quantity information indicative of the quantity of terminal devices which communicate with the relay apparatus. In other words, when controlling the preset second permitted communication traffic volume in the second embodiment, the relay apparatus 20 controls the preset second permitted communication traffic volume further on the basis of the acquired quantity information indicative of the quantity of terminal devices existing in the service area, in addition to the current communication traffic volume. In the following explanation, reference will be made particularly to the difference from the communication control processing according to the first embodiment.

Figure 7:
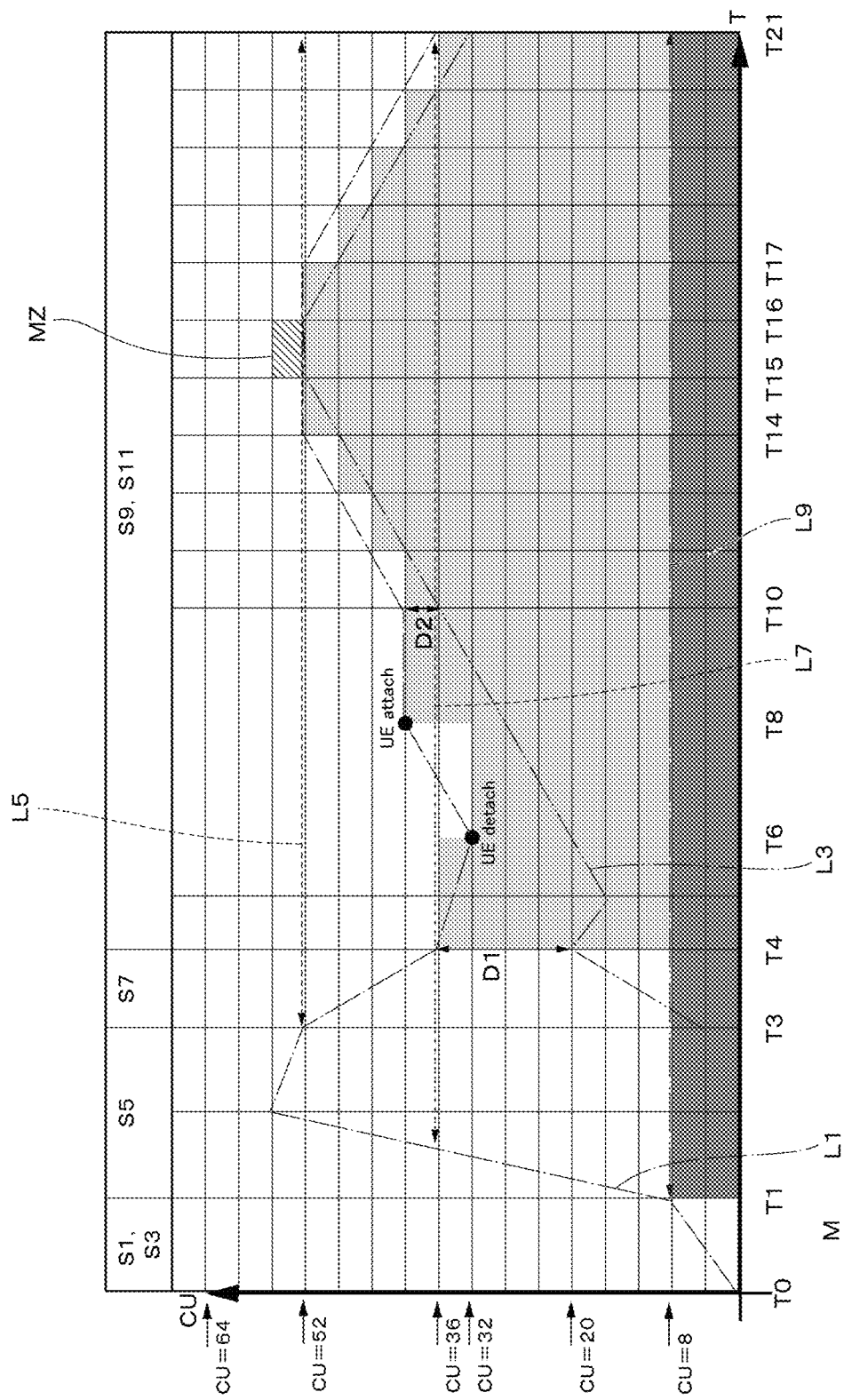
FIG. 7 is a schematic diagram for explaining communication control processing according to a second embodiment.

FIG. 7 is a diagram illustrating the communication control processing when the relay apparatus can acquire the quantity information indicative of the quantity of terminal devices which communicate with the relay apparatus and exist in its service area. When the information acquisition unit 205 illustrated in FIG. 2 can acquire the quantity information indicative of the quantity of terminal devices 10 which exist in the service area and communicates with the relay apparatus 20 as illustrated in FIG. 7, the permitted communication traffic volume control unit 407 for the first core network EPC 40 illustrated in FIG. 3 controls the second permitted communication traffic volume (see the broken line L1) set by the permitted communication traffic volume setting unit 207 for the relay apparatus 20 illustrated in FIG. 2 further on the basis of the quantity information indicative of the quantity of the terminal devices existing in the service area in addition to the current communication traffic volume. More specifically, the permitted communication traffic volume control unit 407 is configured so that: when the permitted communication traffic volume control unit 407 perceives that the terminal device 10a which communicates with the relay apparatus 20 becomes no longer capable of continuing communicating with the relay apparatus 20 because, for example, it has left the communication-enabled area of the relay apparatus 20 (UE detach) as indicated at time T6 in FIG. 7, the permitted communication traffic volume control unit 407 stops increasing the second permitted communication traffic volume; and when the permitted communication traffic volume control unit 407 perceives that communication between the relay apparatus 20 and a new terminal device 10 is started (UE attach) as indicated at time T8 in FIG. 6, the permitted communication traffic volume control unit 407 increases the second permitted communication traffic volume.

Third Embodiment

In a third embodiment, the second permitted communication traffic volume set by the permitted communication traffic volume setting unit 207 illustrated in FIG. 2 is controlled on the basis of communication quality, as the current communication traffic volume, including at least one of a delay amount, delay fluctuations (jitter), and a bit error rate of the current communication between the donor base station 30 and the relay apparatus 20. Under this circumstance, the first embodiment and the second embodiment have been described by explaining that the permitted communication traffic volume control unit which controls the second permitted communication traffic volume set by the permitted communication traffic volume setting unit 207 is included in the first core network EPC 40 as illustrated in FIG. 3; however, in the third embodiment, the permitted communication traffic volume control unit is included in the relay apparatus 20. Incidentally, for example, components included in the relay apparatus 20 may be included in the first core network EPC 40 within a range not causing any contradiction to the content of the communication control processing and components included in the first core network EPC 40 may be included in the relay apparatus 20 within a range not causing any contradiction to the content of the communication control processing.

Figure 8:
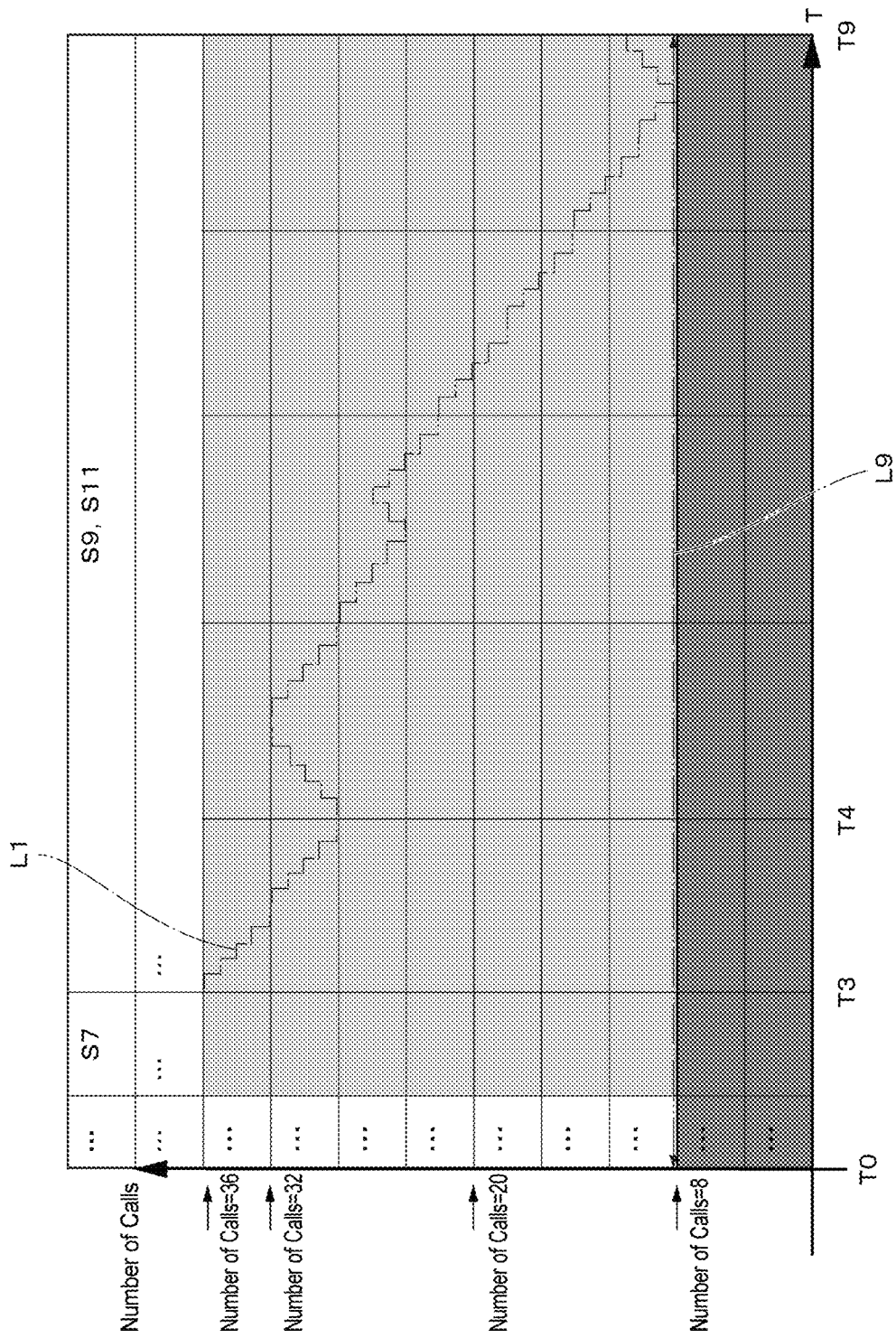
FIG. 8 is a schematic diagram for explaining communication control processing according to a third embodiment.

FIG. 8 is a diagram illustrating the communication control processing when the current communication traffic volume between the donor base station 30 and the relay apparatus 20 can be acquired. Under this circumstance, the "number of calls" in FIG. 8 represents the number of calls of the terminal device 10 and the number of calls: 1 corresponds to "CU": 1 as illustrated in FIG. 6 and FIG. 7. Furthermore, "T" represents time in the same manner as in FIG. 6 and FIG. 7. Referring to FIG. 8, the permitted communication traffic volume control unit included in the relay apparatus 20 dynamically increases or decreases the second permitted communication traffic volume set by the permitted communication traffic volume setting unit 207 illustrated in FIG. 2 (see the broken line L1) on the basis of the communication quality including at least one of the delay amount, the delay fluctuations (jitter), and the bit error rate of the current communication between the donor base station 30 and the relay apparatus 20 which are measured by the communication traffic volume measurement unit 209 illustrated in FIG. 2 at arbitrary timing. More specifically, the permitted communication traffic volume control unit is configured to control the number of calls (quantity) of the terminal devices 10a, whose connection with the relay apparatus 20 is permitted, as the second permitted communication traffic volume.

Incidentally, when the permitted communication traffic volume control unit decreases the second permitted communication traffic volume, the permitted communication traffic volume control unit may be configured to be prohibited from decreasing the second permitted communication traffic volume to a preset lower limit number of calls=8 (lower limit communication traffic volume) (see broken line L9) or less.

Advantageous Effects

When controlling communication of the relay apparatus 20 capable of relaying communication between the terminal device 20 and the donor base station 30 according to the first embodiment of the present invention as described above, the first permitted communication traffic volume for the first communication period, during which the communication traffic volume between the donor base station 30 and the relay apparatus 20 is equal to or more than a specified communication traffic volume, and the second permitted communication traffic volume for the second communication period, during which the communication traffic volume is less than the specified communication traffic volume, are preset and the set second permitted communication traffic volume is controlled on the basis of the current communication traffic volume between the donor base station 30 and the relay apparatus 20. Therefore, necessary bandwidths for the communication between the donor base station 30 and the relay apparatus 20 can be managed appropriately and bandwidths used for the communication between the donor base station 30 and the relay apparatus 20, and the terminal devices 10a can be allocated appropriately, so that the communication quality of the terminal device 10b which directly connects to the donor base station 30 can be guaranteed and the communication quality of the terminal device 10a which connects to the donor base station 30 via the relay apparatus 20 can be guaranteed.

When controlling the preset second permitted communication traffic volume according to the second embodiment of the present invention, the preset second permitted communication traffic volume is controlled further on the basis of the quantity information indicative of the quantity of terminal devices 10 which exist in the service area and communicate with the relay apparatus 20, in addition to the current communication traffic volume. Therefore, the second permitted communication traffic volume can be controlled more accurately. So, when controlling the communication of the relay apparatus 20 capable of relaying the communication between the terminal device 10 and the donor base station 30, the communication quality of the terminal device 10b which directly connects to the donor base station 30 can be guaranteed more appropriately and the communication quality of the terminal device 10a which connects to the donor base station 30 via the relay apparatus 20 can be guaranteed more appropriately.

According to the third embodiment of the present invention, the permitted communication traffic volume control unit of the relay apparatus can control the set second permitted communication traffic volume on the basis of the communication quality including at least one of the delay amount, the delay fluctuations (jitter), and the bit error rate of the current communication between the donor base station 30 and the relay apparatus 20. Therefore, the second permitted communication traffic volume can be controlled more elaborately.

OTHER EMBODIMENTS

The present invention has been described by referring to the embodiments as described above; however, the description and drawings which constitute part of this disclosure should not be understood to limit this invention. Various substitute embodiments, examples, and techniques to be operated will be made clear for those skilled in the art on the basis of this disclosure.

The respective processing steps explained in FIG. 5 can be executed by arbitrarily changing the order or in parallel within a range not causing any contradiction to the processing content. Referring to FIG. 5, for example, step S1 and step S3 may be executed by changing the order or step S1 and step S3 may be executed in parallel.

The aforementioned embodiments have described examples of a mobile communications system according to the LTE specification which is the telecommunications specification for mobile communications; however, the invention is not limited to such examples and the present invention can also be applied to other telecommunications specifications and any telecommunications specifications to be established in future. Specifically speaking, since the macro cell base station is designed to perform radio communication directly with terminal devices, the present invention can be applied as long as it is a system in which there is fear of the occurrence of the following problems: if the radio communication is also used for the backhaul communication of the relay apparatus, resources allocated to the terminal device which directly connects to the macro cell base station may decrease and the communication quality may degrade; and on the other hand, if the communication traffic volume of the terminal device which directly connects to the macro cell base station increases, resources allocated to the backhaul communication of the relay apparatus may become insufficient and the communication quality of the terminal device connected via the relay apparatus may degrade. Necessary bandwidths for the communication between the macro cell base station and the relay apparatus can be managed appropriately and bandwidths used for the communication between the macro cell base station and the relay apparatus, and the terminal devices can be allocated appropriately by applying the communication control method, etc., according to the present invention. So, it is possible to expect the operation and effect capable of guaranteeing the communication quality of the terminal device which directly connects to the macro cell base station, and guaranteeing the communication quality of the terminal device which connects to the macro cell base station via the relay apparatus.

REFERENCE SIGNS LIST 10 terminal device
20 relay apparatus
22 access node
24 relay node
30 donor base station (macro cell base station)
40 first core network EPC
50 femto core network
60 second core network EPC
100 mobile communications system
201, 401 information processing unit
203, 403 recording unit
205, 405 information acquisition unit
207 permitted communication traffic volume setting unit
209 communication traffic volume measurement unit
211 control signal generation unit
407 permitted communication traffic volume control unit

The invention claimed is:

1. A communication control system including a relay apparatus capable of relaying communication between a terminal device or terminal devices and a macro cell base station, the communication control system comprising a computer to execute the functions of:
acquiring communication status information including a past communication traffic volume between the macro cell base station and the relay apparatus;
presetting a first permitted communication traffic volume for a first communication period during which a communication traffic volume between the macro cell base station and the relay apparatus is equal to or more than a specified communication traffic volume, and a second permitted communication traffic volume for a second communication period during which the communication traffic volume is less than the specified communication traffic volume, on the basis of the communication status information;
measuring a current communication traffic volume between the macro cell base station and the relay apparatus; and
controlling the set second permitted communication traffic volume on the basis of the measured current communication traffic volume.

2. The communication control system according to claim 1, wherein the set second permitted communication traffic volume is increased or decreased according to a difference between the set second permitted communication traffic volume and the current communication traffic volume upon communication between the macro cell base station and the relay apparatus.

3. The communication control system according to claim 1, wherein when the relay apparatus is to accept a new call from the terminal device and it is determined that the current communication traffic volume upon the communication between the macro cell base station and the relay apparatus exceeds the set second permitted communication traffic volume, the acceptance of the new call is prohibited.

4. The communication control system according to claim 1, wherein the second permitted communication traffic volume is prohibited from being decreased to a preset lower limit communication traffic volume or less.

5. The communication control system according to claim 1, wherein the set second permitted communication traffic volume is controlled on the basis of quantity information indicative of a quantity of the terminal devices which communicate with the relay apparatus.

6. The communication control system according to claim 1, wherein the second permitted communication traffic volume is controlled on the basis of communication quality including at least one of a delay in the communication between the macro cell base station and the relay apparatus, fluctuations of the communication, and a bit error rate of the communication.

7. The communication control system according to claim 1, wherein a quantity of the terminals whose connection with the relay apparatus is permitted is controlled, as the second permitted communication traffic volume.

8. The communication control system according to claim 1, wherein the first permitted communication traffic volume is set on the basis of a maximum quantity of the terminal devices which can be connected.

9. The communication control system according to claim 1, wherein the relay apparatus performs the functions of acquiring communication status information, presetting a first permitted communication traffic volume, and measuring a current communication traffic volume between the macro cell base station and the relay apparatus; and a core network performs the function of controlling the set second permitted communication traffic volume.

10. A communication control method for controlling communication of a relay apparatus capable of relaying communication between a terminal device or terminal devices and a macro cell base station,
the communication control method comprising the steps of:
acquiring communication status information including a past communication traffic volume between the macro cell base station and the relay apparatus;
presetting a first permitted communication traffic volume for a first communication period during which a communication traffic volume between the macro cell base station and the relay apparatus is equal to or more than a specified communication traffic volume, and a second permitted communication traffic volume for a second communication period during which the communication traffic volume is less than the specified communication traffic volume, on the basis of the communication status information;
measuring a current communication traffic volume between the macro cell base station and the relay apparatus; and
controlling the set second permitted communication traffic volume on the basis of the measured current communication traffic volume.

11. A non-transitory computer readable medium storing a program which causes a computer to execute steps of:
acquiring communication status information including a past communication traffic volume between a macro cell base station and a relay apparatus;
presetting a first permitted communication traffic volume for a first communication period during which a communication traffic volume between the macro cell base station and the relay apparatus is equal to or more than a specified communication traffic volume, and a second permitted communication traffic volume for a second communication period during which the communication traffic volume is less than the specified communication traffic volume, on the basis of the communication status information;

measuring a current communication traffic volume between the macro cell base station and the relay apparatus; and controlling the set second permitted communication traffic volume on the basis of the measured current communication traffic volume.

12. A relay apparatus capable of relaying communication between a terminal device or terminal devices and a macro cell base station, the relay apparatus comprising a computer to execute the functions of:

acquiring communication status information including a past communication traffic volume between the macro cell base station and the relay apparatus;

presetting a first permitted communication traffic volume for a first communication period during which a communication traffic volume between the macro cell base station and the relay apparatus is equal to or more than a specified communication traffic volume, and a second permitted communication traffic volume for a second communication period during which the communication traffic volume is less than the specified communication traffic volume, on the basis of the communication status information;

measuring a current communication traffic volume between the macro cell base station and the relay apparatus; and generating a control signal for controlling the set second permitted communication traffic volume on the basis of the measured current communication traffic volume.

* * * * *